United States Patent [19]

Buzzi

[11] Patent Number: 4,618,091

[45] Date of Patent: Oct. 21, 1986

[54] APPARATUS FOR CONTROLLING THE PASSAGE OF A LIQUID

[75] Inventor: Guenter Buzzi, Schiltach, Fed. Rep. of Germany

[73] Assignee: Hans Grohe GmbH & Co. KG, Fed. Rep. of Germany

[21] Appl. No.: 718,872

[22] Filed: Apr. 2, 1985

[30] Foreign Application Priority Data

Apr. 17, 1984 [DE] Fed. Rep. of Germany ....... 3414481

[51] Int. Cl.⁴ ............................................. G05D 23/13
[52] U.S. Cl. .................................. 236/12.12; 236/69; 310/306
[58] Field of Search ............... 236/12.12, 69; 318/117; 310/306

[56] References Cited

U.S. PATENT DOCUMENTS

| | | | |
|---|---|---|---|
| 2,072,384 | 3/1937 | Schmidt | 236/12.12 X |
| 2,146,930 | 2/1939 | Bassett, Jr. | 236/12.12 X |
| 3,123,086 | 3/1964 | Kleiss | 236/12.12 X |
| 3,322,342 | 5/1967 | Veale | 236/12.12 |
| 3,691,408 | 9/1972 | Rosso | 310/306 |
| 3,719,532 | 3/1973 | Falkenberg et al. | 310/306 X |
| 3,759,244 | 9/1973 | Konet | 126/110 R |
| 4,014,713 | 3/1977 | Markman et al. | 310/306 X |
| 4,520,305 | 5/1985 | Cauchy | 310/306 X |
| 4,528,709 | 7/1985 | Getz et al. | 236/12.12 X |

*Primary Examiner*—William E. Tapolcai
*Attorney, Agent, or Firm*—Steele, Gould & Fried

[57] ABSTRACT

An apparatus for controlling or regulating the throughflow or passage of at least one liquid, particularly for temperature regulation or control, contains at least one valve with an electrical valve drive, which is controlled by an electronic control unit. The control unit makes available the signals necessary for operating the valve drive. The power supply for the control unit and the valve drive is provided by a thermocouple, whose one side is exposed to the temperature of the liquid to be regulated and whose other side is exposed to a temperature differing therefrom. The apparatus preferably contains a storage battery.

17 Claims, 4 Drawing Figures

APPARATUS FOR CONTROLLING THE PASSAGE OF A LIQUID

BACKGROUND OF THE INVENTION

The invention relates to an apparatus for controlling or regulating the passage of at least one liquid at a temperature differing from ambient temperature with the aid of a valve arranged in a valve casing and having a variable through-flow.

It is known to regulate or control the temperature by using heater thermostats, which e.g. contain a heat sensor filled with an expansion liquid and which is connected to the heater valve. In the case of more pronounced expansion of the expansion liquid, action takes place on the valve, so that the latter reduces the passage of hot water permitting an indirect temperature regulation. Although apparatuses of this type make it possible to set the temperature to be regulated, further actions or interventions are not possible.

SUMMARY OF THE INVENTION

The problem of the present invention is to provide an apparatus making it possible to carry out an optimum regulation or control of the through-flow or passage and particularly of a temperature, the apparatus being operable without auxiliary power.

According to the invention, this problem is solved in that the valve has an electrical valve drive or gear which, for the supply of power thereto, is connected to a thermocouple exposed to the temperature of the liquid and to a temperature differeing therefrom. Thus, the apparatus obtains all the power necessary for its operation from a thermocouple, so that there is no need for an extraneous supply via the mains or a battery. This makes it possible to fit the apparatus directly wherever it is required. Continuous maintenance of the apparatus is unnecessary, because no batteries have to be replaced.

In practice, preference is given to the use of several thermocouples, in order to obtain the necessary operating voltages. However, reference is continuously made hereinafter to a single thermocouple, without pointing out in detail that this can refer to an arrangement of several interconnecting thermocouples.

According to the invention, the apparatus can also have an electronic control unit, which produces the signals necessary for operating the valve drive and by means of at least one control output connected to the valve drive are applied thereto. With the aid of this electronic control unit, it is possible to take account of all the desired parameters when controlling or regulating the passage or through-flow. Thus, for example, the temperature or passage quantity can be set in the control unit. It is also possible to provide a time switch in the latter permitting a time-controlled operation of the valve drive.

According to a further development, the electronic control unit has at least one control input. In the case of a temperature control or regulation, the heat sensor can be connected here and measures the actual temperature. It is naturally also possible to connect a pressure sensor or a sensor for any other measured quantity.

The actual electronics in the control unit can operate in analog manner, or can be constructed as digital control electronics. It is advantageous to use a microprocessor with the aid of which it is possible to process the most varied parameters.

If in the case of prolonged non-use of the valve, the liquid has cooled to ambient temperature, so that the thermocouple no longer supplies a voltage, on putting into operation again it can be ensured that the liquid initially flows through it in an unimpeded manner. As it then soon reaches the higher temperature, after a short time the thermocouple supplies a voltage, so that the valve drive can be operated. However, it is very advantageous if, according to a further development of the invention, the apparatus has an accumulator or rechargeable battery for energy storing purposes. In this case, on putting into operation, the liquid does not initially have to be allowed to completely flow through and instead the energy contained in the accumulator can be used for operating the valve drive.

If the apparatus is to be e.g. used as a heater thermostat or in other cases where the temperature of a liquid is higher than the ambient temperature, according to the invention the thermocouple is constructed as a sleeve, which surrounds a tube through which the liquid flows and which is provided on its outside with cooling fins. In this case, one side and namely the hot side of the thermocouple engages on the tube, whilst the other side, i.e. the cold side of the thermocouple is provided with the cooling fins, so that this side is exposed to the ambient temperature, e.g. the air temperature or is connected to some other cold medium.

In the simplest case, thermocouples comprise two conductors with different work functions, which are soldered together at two points. One soldered point or joint is called one side of the thermocouple, whilst the other soldered point or joint is called the other side of the thermocouple, and these expressions are used in this sense hereinafter.

The invention also proposes that in the case of a passage control or regulation of a single liquid, one side of the thermocouple is connected to a flow pipe carrying the liquid, whilst its other side has cooling fins. Thus, with the aid of these cooling fins, one side of the thermocouple is exposed to ambient temperature. In the case of the apparatus proposed by the invention, the thermocouple is only required for power supply purposes. Thus, in principle, it is unimportant whether the liquid temperature is higher or lower than ambient temperature.

When controlling or regulating liquids with two different temperatures, it can advantageously be provided according to the invention that one side of the thermocouple is exposed to the higherliquid temperature and the other side to the lower liquid temperature. This can relate both to the control or regulation of two different liquids, provided that they are miscible, and, advantageously, to the control or regulation of the same liquid.

According to a further development, for the control or regulation of the passage or through-flow, particularly the mixing ratio, of cold and hot liquid, the thermocouple is arranged in the valve casing in such a way that its cold side is exposed to the cold liquid and its hot side to the hot liquid. In this way, the valve can be constructed as a single unit, which contains both the valve drive and the thermocouple. As a result, when installing such an apparatus, e.g. as a sanitary mixing valve, it is possible for the installation to be carried out by a single plumber competent for dealing with water pipes, without it being necessary to call in another technically skilled person, namely the electrician. This is particularly important, e.g. in baths, where special regulations apply due to the humidity.

According to the invention, the valve casing also contains the valve drive and the thermocouple. Preferably, the valve casing contains the electronic control unit. Here again, it is ensured that the valve casing can be considered and installed as one unit. It is naturally also conceivable by using a plug to form a connection with the control unit via a line, which would be safely possible in this case, because the voltages supplied by the thermocouple are very low.

If the valve casing has a liquid guide for the cold liquid and a liquid guide for the hot liquid, according to a further development of the invention, said two liquid guides are at least partly separated by a partition, which contains the thermocouple. It is particularly advantageous if the partition is constructed as a thermocouple.

It is particularly advantageous to use the measures proposed by the invention in the case of a mixing valve, particularly for sanitary purposes with a temperature regulation and with a cold water intake and a hot water intake. Particular importance is then attached to the fact that the valve casing including the thermocouple, the valve drive and the electronic control unit forms a closed and separately installable unit. The apparatus need merely be connected to the water main by the plumber, there being no need to call in an electrician. All safety requirements concerning wet areas are fulfilled in that all electrical or electronic elements are integrated into the casing and are operated at a low safety voltage.

In the case of temperature regulation or control with the aid of a liquid and two different temperatures, the invention provides for a heat sensor to be arranged in each intake and in the outlet. It would in itself suffice to only provide a heat sensor in the outlet, so as to allow a regulation to take place. However, the latter would in certain circumstances not operate in an optimum manner and could lead to vibration. However, as the electronic control unit is in a position to process the most varied input quantities, as a result of the different intake temperatures it can in this case set the desired outlet temperature particularly favourably, rapidly and in power-saving manner.

This possibility is further improved by arranging a pressure sensor in each intake. In this case, the electronic control unit can also take account of the different pressures on the hot/cold water intakes.

The invention also proposes that the electronic control unit has at least one additional control input, which can e.g. be an input for taking account of the pressure. However, it is also possible to connect a heat sensor to the additional control input and e.g. measures the temperature outside the house.

According to the invention, the electronic control unit can have an input means which is operable from the outside. In the simplest case, it can be a rotating spindle connected to a potentiometer with the aid of which it is possible to set the desired temperature. It is obviously also possible to digitally feed in the desired temperature by using a keyboard. In this case, the keyboard could also be used to e.g. feed in a period of time. If the electronic control unit has a counter or a clock, this can be used, as a result of the available measuring parameters, to e.g. ensure that a bath does not overflow. As a result of the pressure sensors, it is aware of the pressure prevailing in the supply pipes and as a result of the geometrical characteristics of the valve casing and the particular valve opening position, it can calculate which liquid quantity per unit of time flows out of the outlet. Thus, in the case of a known bath size, it can calculate at what time it must close the valve again to prevent the bath from overflowing.

The invention also provides for the electronic control unit to have at least one additional control output, which can e.g., be used for temperature indication purposes. It can also serve as a warning signal, if e.g. the temperature in one direction is exceeded. It is also possible to have a water consumption or power consumption indication.

The electronic control unit can also be set in such a way that it does not exceed a maximum liquid temperature at its outlet, even in the case of faulty operation and this can be used to prevent risks to children. It would also be possible, to e.g. carry out an automatic conversion to a hand shower, if it could be removed from the holder.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
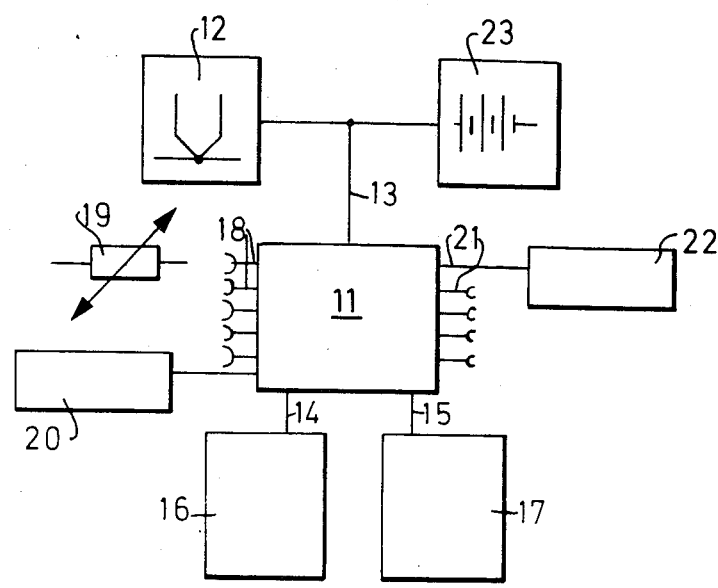
FIG. 1 a block circuit diagram of the component of the apparatus proposed by the invention.

The central element of the block circuit diagram of FIG. 1 is the electronic control unit 11, which is supplied with power from a thermocouple 12 via a supply line 13. The control unit produces the signals necessary for operating a valve drive and in the represented embodiment supplies them via two control lines 14, 15 to in each case one electromechanical control drive 16, 17. Both control drives can e.g. be electric motors.

At its left-hand side in FIG. 1, electronic control unit 11 has a total of five control inputs 18, to one of which is connected a symbolically represented head sensor 19, which e.g. makes it possible to measure the actual temperature of the outlet of a mixing valve.

A diagrammatically represented input means 20 is also shown on the left-hand side of FIG. 1 and in the simplest case this can be used for setting the desired temperature. The input means 20 can also be a keyboard, with the aid of which the most varied desired values can be set.

On its right-hand side in FIG. 1, the electronic control unit 11 has a total of five control outputs 21, one of which is connected to a display 22, from which it is e.g. possible to read off the actual temperature, or a desired temperature.

To ensure that the control input 11 continues to function in the case where the thermocouple 12 briefly supplies no voltage, a rechargeable battery 23 is additionally connected to supply line 13. The battery is charged when the thermocouple 12 supplies a voltage. To prevent the return flow of current from battery 23 to thermocoupl 12, it is possible to provide not shown means, e.g. diodes.

The apparatus proposed by the invention and shown in FIG. 1 functions as follows. The control unit receives its power supply from thermocouple 12, optionally supported by battery 23. The desired values are fed in at input means 20. As a result of the information concerning the actual temperature made available by heat sensor 19 and the desired values fed in with the aid of input mens 20, control unit 11 circulates the signals to be supplied to both control drives 16, 17 via control lines 14, so that the desired value can be reached. As soon as the values supplied by heat sensor 19 differ, the information at the two control drives 16, 17 correspondingly change. Control unit 11 can either contain analog or digital electronics and in the latter case it preferably contains a microprocessor.

Simultaneously, on display means 22, the desired displays are made available, e.g. the actual temperature, or a divergence from the actual and desired temperature. Other signals, e.g. acoustic information can be supplied to the further control outputs 21.

Figure 2:
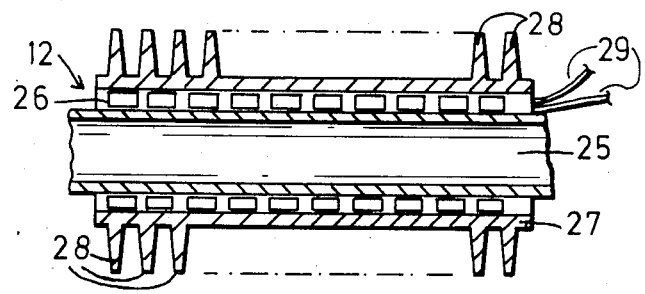
FIG. 2 a longitudinal section through a thermocouple constructed as a sleeve and mounted on a liquid-carrying pipe.

FIG. 2 shows an embodiment for an actually usable thermocouple 12. In the case of the embodiment according to FIG. 2, a liquid flows through a pipe 25, said liquid having a temperature differing from ambient temperature. Thermocouple 12 is constructed as a sleeve 26, which is mounted on pipe 25. With its inside, sleeve 26 surrounds pipe 25, the inside of sleeve 26 representing the hot side of the thermocouple. On the outside of sleeve 26 is provided a cylindrical sleeve 27, which is provided on its outside with cooling fins 28. Cooling fins 28 are located roughly in planes running at right angles to the longitudinal axis of sleeve 26 and cross-sectionally taper somewhat outwards. Only one of the several cooling fins 28 is shown in FIG. 2. The cooling fins increase the outer surface of cylindrical sleeve 27, so that the outside of the thermocouple sleeve 26 is kept roughly at ambient temperature. As a result of the temperature difference between the outside of sleeve 26 and the inside corresponding to the temperature of pipe 25, the thermocouple 12 formed by sleeve 26 supplies a voltage, which can be taken with the aid of leads 29 and can be supplied to control unit 11 via supply line 13. The thermocouple embodiment according to FIG. 2 is particularly suitable in those cases where the passage of only a single liquid at a temperature differing from ambient temperature is to be regulated or controlled. Reference is made to a thermostatic valve for a hot water heater as an example of the embodiment according to FIG. 2.

Figure 3:
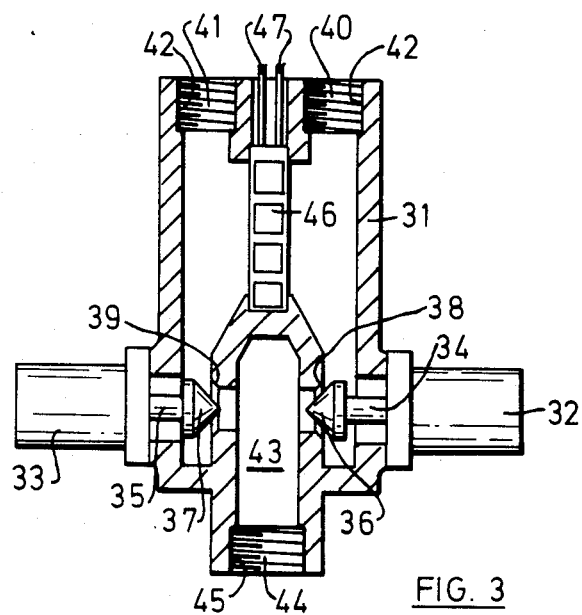
FIG. 3 a longitudinal section through a first embodiment of a mixing valve.

FIG. 3 shows a mixing valve, particularly for sanitary purposes. The mixing valve contains a valve casing 31, to whose right and left-hand sides in FIG. 3 is fitted in each case one electromechanical valve drive 32, 33, both of which are e.g. electric motors acting mechanically via a tappet or plunger 34, 35 on a valve cone 36, 37. Each of the valve cones faces a valve seat 38, 39 corresponding to the conical shape of the valve cone. The further the particular plunger 34, 35 is extended from the electric motor, the smaller the passage between the valve seat and the associated valve cone, so that the passage is controlled by the valve.

Valve casing 31 has two delivery pipes 40, 41 for water. One of the two pipes is used for supplying cold water, whilst the other is used for supplying hot water. Both delivery pipes 40, 41 are provided in their circular cylindrical upper area with in each case one internal thread 42, in which can be screwed a delivery pipe.

Delivery pipe 40 leads to the valve formed by the valve cone 36 and valve seat 38, whilst delivery pipe 41 leads to the valve formed from cone 37 and valve seat 39. The two valves formed in this way run in a common channel 43 in the longitudinal direction of the valve and which passes into the water outlet 44 of valve casing 31. Water outlet 44 also has an internal thread 45 for the connection of a pipe or an outlet.

The space leading from the delivery pipe 40 to the valve is separated from the space leading from delivery pipe 41 to the valve by a thermocouple 46, which consequently forms the partition between the two water pipes. Thermocouple 46 is constructed and arranged in such a way that its one side is connected to the liquid flowing through delivery pipe 41, whilst its other side is connected to the liquid flowing through delivery pipe 40. If the two liquids have different temperatures, the thermocouple 46 produces a voltage, which can be removed by means of the two lines 47 on the top of valve casing 31. For simplification reasons, FIG. 3 does not show the line connection between thermocouple 46, the not shown electronic control unit and the two valve drives 32, 33.

Figure 4:
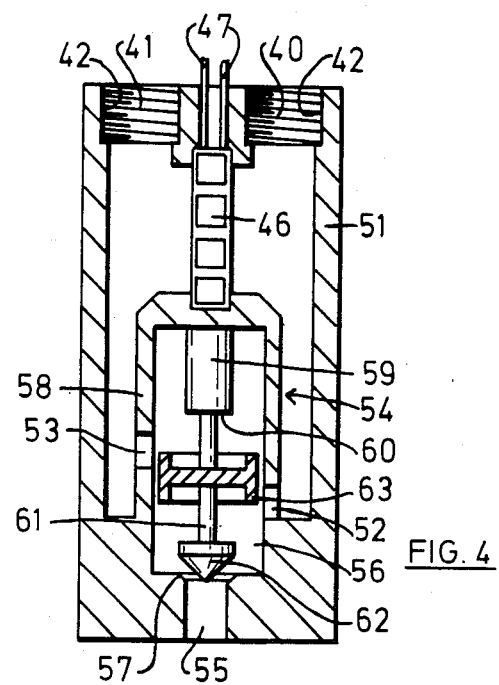
FIG. 4 a second embodiment of a mixing valve.

In the embodiment of a mixing valve shown in FIG. 4 casing 51 is cylindrical. It is provided on its top with an intake 40 for cold water and an intake 41 for hot water. Once again, the two intakes have an internal thread 42 for screwing in a pipe or the like. The cold water intake 40 leads to a valve opening 52, whereas the hot water intake 41 leads to a second, radially arranged valve opening 53 which is positioned closer to the upper end of valve casing 51 in FIG. 4 than the first valve opening 52.

A thermocouple 46 is arranged as a partition between the two water pipes, its one side being exposed to the hotter water temperature, whereas its other side is exposed to the colder water temperature.

A hollow cylinder 54 is arranged in valve casing 51 below thermocouple 46 and on its top surface forms a mounting support for thermocouple 46, whereas its bottom surface passes in one piece into valve casing 51. At this point, valve casing 51 has a longitudinally directed bore 55 which on passing into the inner space 56 of hollow cylinder 54 has an edge forming valve seat 57 and which is provided with a chamfer. The two valve openings 52, 53 are arranged in the circumferential wall 58 of hollow cylinder 54.

Centrally within the inner space at the upper end of hollow cylinder 54 is arranged a valve drive 59, which can e.g. be an electric motor. A plunger 61 projects from the bottom 60 of valve drive 59 and can be moved to a greater or lesser extent upwards and downwards with the aid of valve drive 59. At its bottom end in FIG. 4, plunger 61 has a valve cone 62, which cooperates with the valve seat 57 to form a valve having a variable through-flow or passage.

In addition, in the area roughly in the centre of its length, plunger 61 has a slide member 63, which is cross-sectionally shaped like a H and is at least partially constructed in rotationally symmetrical manner about the longitudinal axis of plunger 61. On displacing plunger 61, slide member 63 slides in the longitudinal direction of the valve casing and closes to a greater or lesser extent valve opening 53 or 52.

Through the displacement of plunger 61 and the slide member 63 connected thereto, a mixture of the liquid flowing through valve opening 52 and the liquid flowing through valve opening 53 can be obtained and simultaneously valve cone 62, in conjunction with valve seat 56 leads to more or less pronounced closing of the valve. In the case of the embodiment according to FIG.

4, the lines to the electronic control unit 11 are once again not shown.

The use of the invention has been described in detail in connection with mixing valves, sanitary mixing valves and thermostatic valves, this representing a particularly favourable use of the invention. However, it is in principle possible to use the invention wherever there are two temperature potentials and where a control, regulation, indication or monitoring of states without external energy is to be carried out. In this case, the energy or power necessary for carrying out the processes can be obtained with the aid of thermocouples and optionally the supplied energy can be stored with the aid of an accumulator.

The invention is e.g. usable in connection with long-distance heating, as well as in equipping and in the power supply of relay stations, which must in particular be controlled or monitored in the case of a mains failure.

In certain circumstances, the technical solution proposed by the invention can be used in certain solar installations, particularly for control functions at those times when there is no light, but stored thermal energy in the form of heated water is present and is to be controlled.

It is also possible to directly convert solar energy into current, e.g. at available cold water reservoirs, which can be used as a cold potential. The objects heated by the sun then form the hot potential. This can take place particularly advantageously on flowing water, because the latter always has a relatively cold temperature.

The invention gives particular preference to the use of Peltier components, which supply high currents for low voltages.

What is claimed is:

1. A sanitary mixing valve for controlling the mixing ratio of liquids of differing temperatures and generating electrical power comprising:
   a casing having two fluid inlet means and a fluid outlet means;
   thermocouple means within said casing at least zonally separating the differing liquids in said casing;
   at least one valve means having variable passages and arranged in said casing for controlling passage of said liquids in admixture through said outlet means, said valve means having an electrical valve drive associated therewith and operatively connected to said thermocouple means; and
   an electronic control unit for producing signals for controlling the operation of said valve means, whereby flow of liquids of differing temperature through said casing causes the thermocouple to produce a voltage for activation of said electronic control unit.

2. An apparatus according to claim 1, wherein the electronic control unit has at least one control input.

3. An apparatus according to claim 1, wherein it has an accumulator or a rechargeable battery for storing the power produced by the thermocouple.

4. An apparatus according to claim 1, wherein the thermocouple is constructed as a sleeve surrounding a tube through which a liquid flows and whose outside is provided with cooling fins.

5. An apparatus according to claim 4, wherein for the control or regulation of the passage, particularly the mixing ratio, of hot and cold liquid, the thermocouple is arranged in the valve casing in such a way that its one side is exposed to the cold liquid and its other side is exposed to the hot liquid.

6. An apparatus according to claim 1, wherein the valve casing contains the valve drive and the thermocouple.

7. An apparatus according to claim 1, wherein the valve casing has a partition at least zonally separating the pipe for the cold liquid and for the hot liquid and which contains or is formed by the thermocouple.

8. An apparatus according to claim 1, wherein it is a mixing valve, particularly for sanitary purposes with temperature regulation and a hot water intake and a cold water intake.

9. An apparatus according to claim 2, wherein the electronic control unit has at least one additional control output.

10. An apparatus according to claim 1, wherein the electronic control unit has an input means operable from the outside.

11. An apparatus according to claim 1, wherein the electronic control unlit has at least one additional control output.

12. An apparatus according to claim 1, wherein the thermocouple is a Peltier component.

13. The valve of claim 1 wherein two valve means are provided and each valve means has an electrical valve drive associated therewith.

14. The valve of claim 1 wherein said electronic control unit is provided with at least one control input connected to said valve drive.

15. The valve of claim 1 wherein a hollow cylinder is arranged in said valve casing below said thermocouple means, said cylinder forming a support for said thermocouple means and together with said thermocouple means forming a partition, said cylinder having two openings for flow of said liquids into said cylinder for admixture before passage into said outlet.

16. The valve of claim 15 wherein said cylinder openings form the said passages for said valve means.

17. The valve of claim 16 wherein a valve drive is mounted within said cylinder, including a plunger means connected to said valve drive for reciprocation by said valve drive and extending to said outlet means, whereby said plunger means and outlet means form a variable passage, and a slide member mounted on said plunger means adapted to open and close said cylinder openings during reciprocation.

* * * * *

UNITED STATES PATENT AND TRADEMARK OFFICE
CERTIFICATE OF CORRECTION

PATENT NO. : 4,618,091

DATED : October 21, 1986

INVENTOR(S) : Guenter Buzzi

It is certified that error appears in the above-identified patent and that said Letters Patent is hereby corrected as shown below:

Column 1, line 33, delete "differeing" and insert --differing--.

Column 8, line 32, delete "unlit" and insert --unit--.

Signed and Sealed this

Eleventh Day of August, 1987

Attest:

DONALD J. QUIGG

*Attesting Officer*  *Commissioner of Patents and Trademarks*